US012136131B2

(12) United States Patent
Ivachev et al.

(10) Patent No.: US 12,136,131 B2
(45) Date of Patent: Nov. 5, 2024

(54) AUTOMATIC RECOGNITION OF DRILLING ACTIVITIES BASED ON DAILY REPORTED OPERATIONAL CODES

(71) Applicant: Schlumberger Technology Corporation, Sugar Land, TX (US)

(72) Inventors: Aleksei Ivachev, Tyumen (RU); Vladimir Skvortsov, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 155 days.

(21) Appl. No.: 17/904,109

(22) PCT Filed: Feb. 12, 2021

(86) PCT No.: PCT/US2021/017850
§ 371 (c)(1),
(2) Date: Aug. 12, 2022

(87) PCT Pub. No.: WO2021/163475
PCT Pub. Date: Aug. 19, 2021

(65) Prior Publication Data
US 2024/0029176 A1    Jan. 25, 2024

Related U.S. Application Data

(60) Provisional application No. 62/976,434, filed on Feb. 14, 2020.

(51) Int. Cl.
*G06Q 10/06* (2023.01)
*G06Q 10/0631* (2023.01)
(Continued)

(52) U.S. Cl.
CPC ....... *G06Q 50/02* (2013.01); *G06Q 10/06313* (2013.01); *G06Q 10/0639* (2013.01); *E21B 2200/20* (2020.05)

(58) Field of Classification Search
None
See application file for complete search history.

(56) References Cited

U.S. PATENT DOCUMENTS

2004/0073404 A1  4/2004  Brooks et al.
2009/0050319 A1  2/2009  Kaminsky et al.
(Continued)

OTHER PUBLICATIONS

Al Salat (Master Thesis 2016, Performance Measurement and Efficiency Improvement for onshore Drilling Rigs Operated by OMV, Published 2016).*

(Continued)

*Primary Examiner* — Matthew D Henry
(74) *Attorney, Agent, or Firm* — Jeffrey D. Frantz

(57) ABSTRACT

Automatic recognition of drilling activities based on daily reported operational codes includes obtaining a drilling report for a well. The drilling report includes codes. The method further includes obtaining a template comprising rules comprising a rule. The rule maps one or more codes of the multiple codes from the drilling report to an activity label of activity labels. Mapping the activity labels to the drilling report is performed using the rules to identify an occurrence of an activity from the drilling report with the activity label. An activity list is presented that includes the activity label with timing information for the activity at the well.

20 Claims, 12 Drawing Sheets

(51) Int. Cl.
G06Q 10/0639 (2023.01)
G06Q 50/02 (2012.01)

(56) References Cited

U.S. PATENT DOCUMENTS

| | | | |
|---|---|---|---|
| 2010/0114493 A1* | 5/2010 | Vestal | E21B 41/00 |
| | | | 702/9 |
| 2016/0275133 A1* | 9/2016 | Moore | E21B 47/00 |
| 2019/0292908 A1 | 9/2019 | Karimi Vajargah et al. | |
| 2019/0293815 A1 | 9/2019 | Jocker et al. | |
| 2022/0065093 A1* | 3/2022 | Mittal | G06Q 10/06393 |

OTHER PUBLICATIONS

Search Report and Written Opinion of International Patent Application No. PCT/US21/17850 dated Apr. 30, 2021, 8 pages.
Extended Search Report issued in European Patent Application No. 21754281.0 dated Feb. 8, 2024, 11 pages.
Killelea, M., "IADC launches DDR Plus to enable more granular data collection, support inductry's digital revolution", Drilling Contractor, 2019, retrieved from the Internet: URL:https://drillingcontractor.org/iadc-launches-ddr-plus-to-enable-more-granular-data-colletction-support-industrys-digital-recolution-51063 [retrieved on Jan. 26, 2024], 5 pages.

* cited by examiner

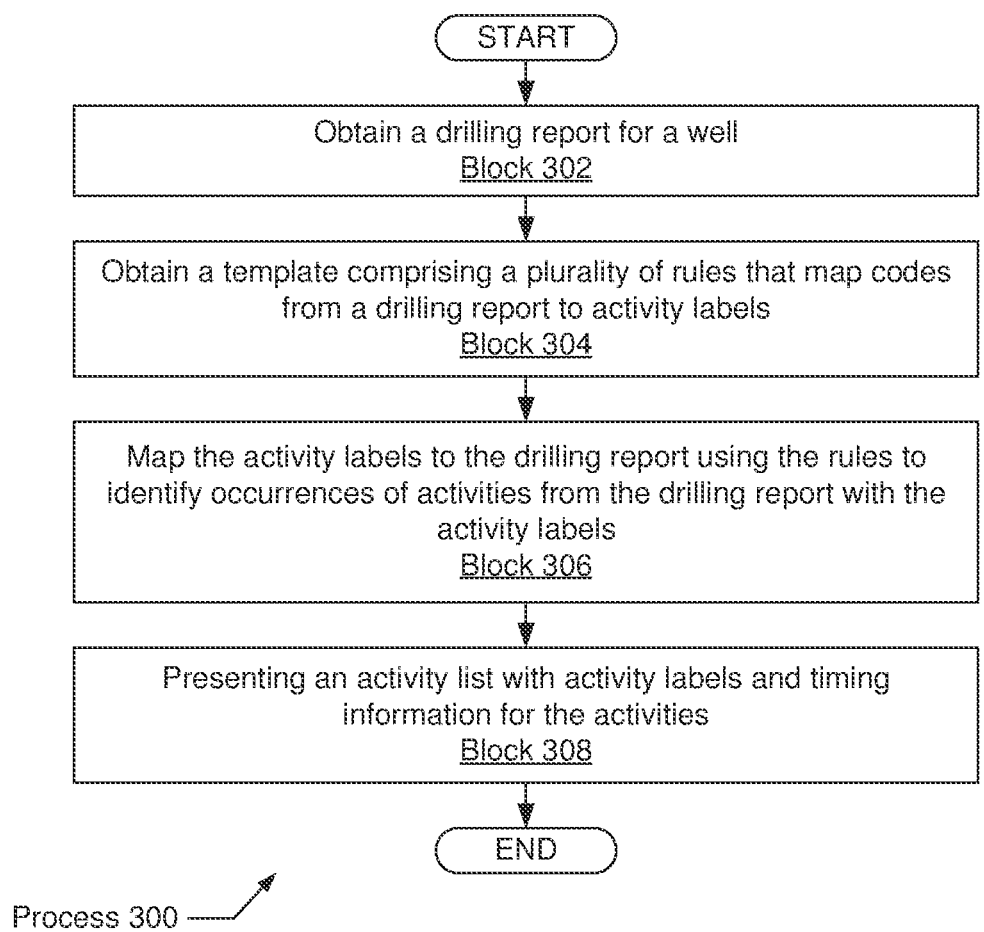
FIG. 3.1

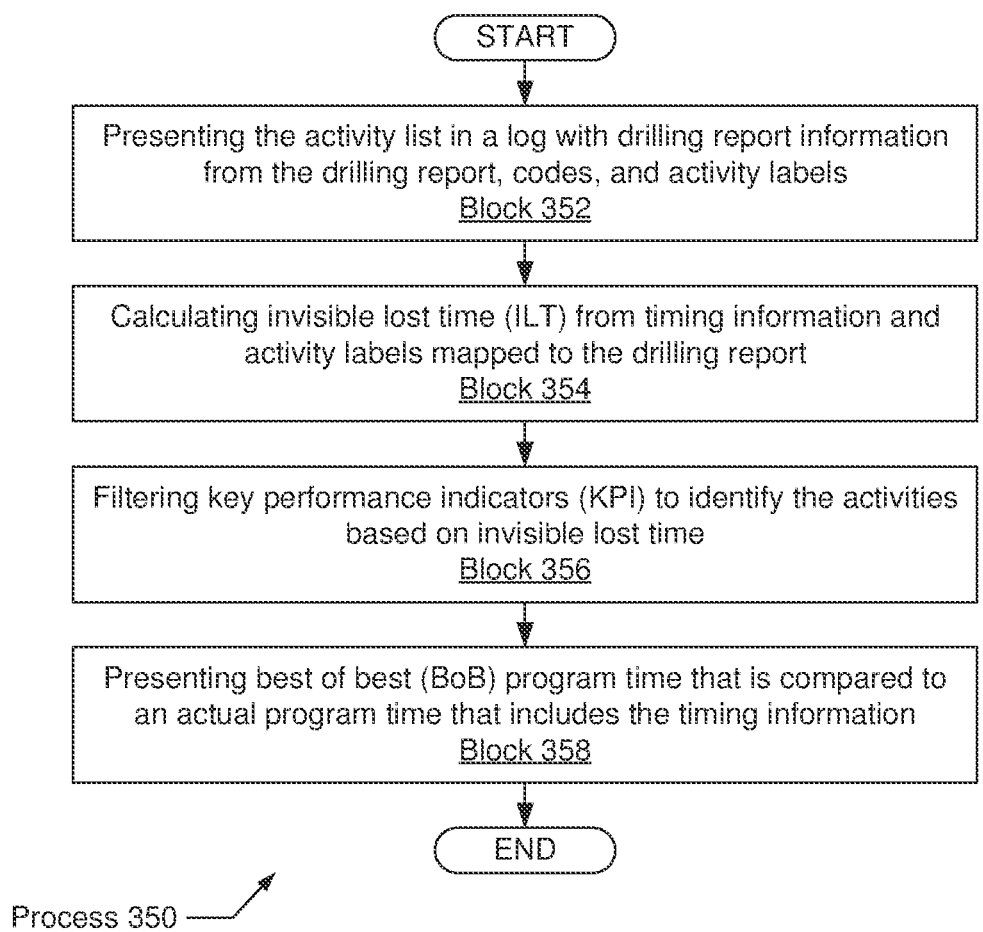
FIG. 3.2

| Activity | Sub Activity | Start Rules | Include Rules | End Rules | Include Start Rules | |
|---|---|---|---|---|---|---|
| Preparation | RIG MOVE | (PR, RUD), (RM, RUD), (RM, PMO), (PR, %), (RM, %) | | | | ← 407 |
| | | | | | | ← 408 |
| P/U, M/U & RIH - BHA | P/U, M/U & RIH BHA | (AW, DRT), (D__, DRT) | | | | ← 409 |
| | Formation Integrity Test | (D__, PRE), (D__, FST) | | | | ← 410 |
| Drilling to CSG Point | Drilling to CSG Point | (PH, DRR), (PH, DRM), (D__, DRR), (D__, DRM), (PH, DRS), (D__, DRS), (PH, HOP), (D__, HOP) | (%, %) | | | ← 411 |
| Circ, W/Trip, POOH, L/D-BHA | Circ. B/U (@TD) | (PH, PCD), (D__, PCD) | | | | ← 412 |
| | Wiper, POOH L/D BHA | (PH, DRT), (D__, DRT), (PH, REM), (D__, REM) | (PH, PCD), (PH, PCD), (PH, CWT), (D__, DSE), (D__, BPR), (D__, BPT) | | | ← 413 |
| RIH CSG to TD | CSG R/U | (C__, RUD) | | | | ← 414 |
| | RIH CSG to TD | (PH, CLR), (C__, CLR) | (C__, PCD), (PH, PCD), (C__, RUD), (PH, RUD), (C__, CSR) | | | ← 415 |
| Cementing | Circ for Cement | (C__, PCD) | | | (C__, RUD) | ← 416 |
| | Run/Pull Stinger | (PH, CSR), (C__, CSR) | | | | ← 417 |
| | Cement CSG LNR | (C__, CLC), (C__, WOC) | | | | ← 418 |

401 / 402 / 403 / 404 / 405 / 406

Template 400

*FIG. 4.1*

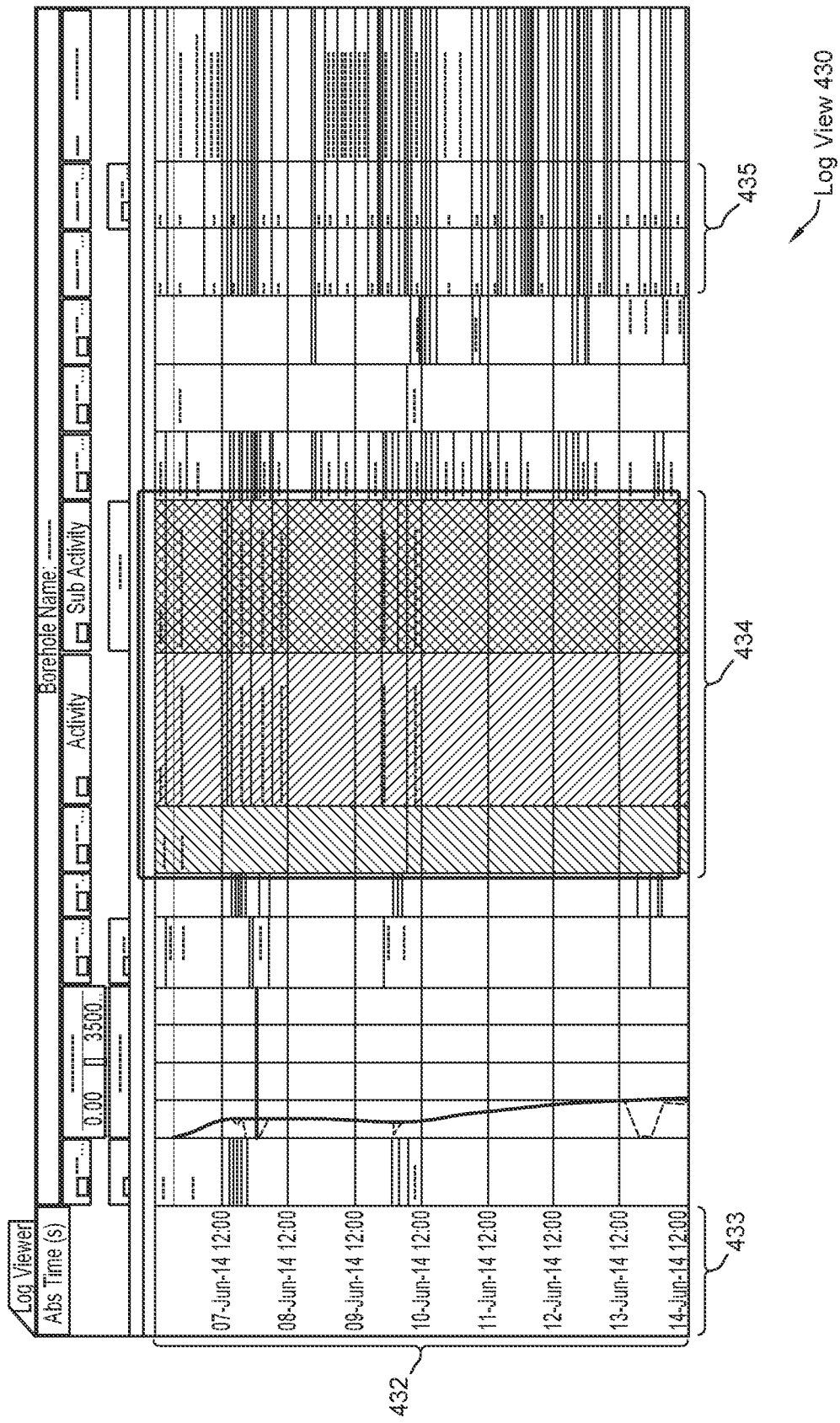
FIG. 4.2

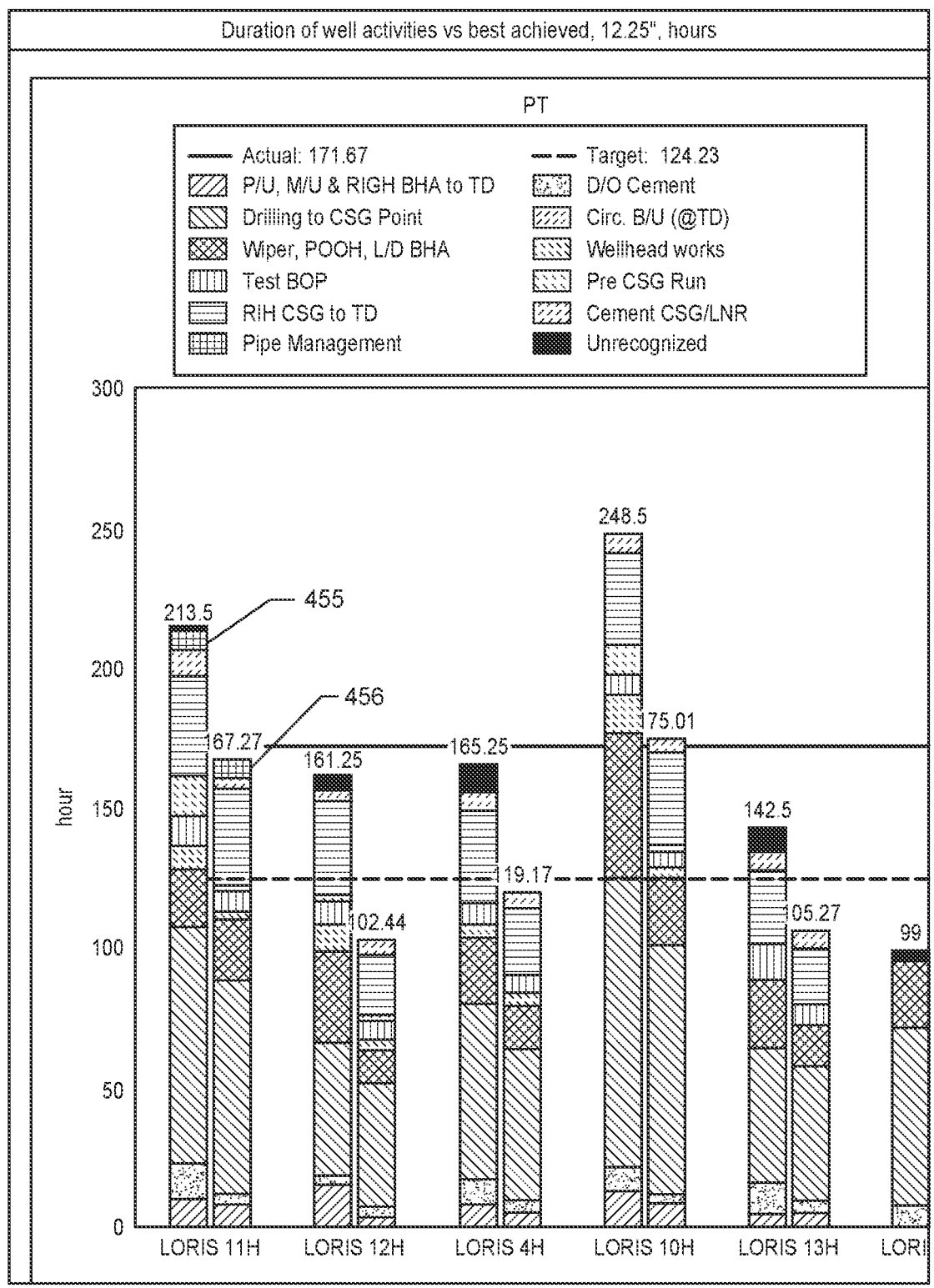
FIG. 4.3

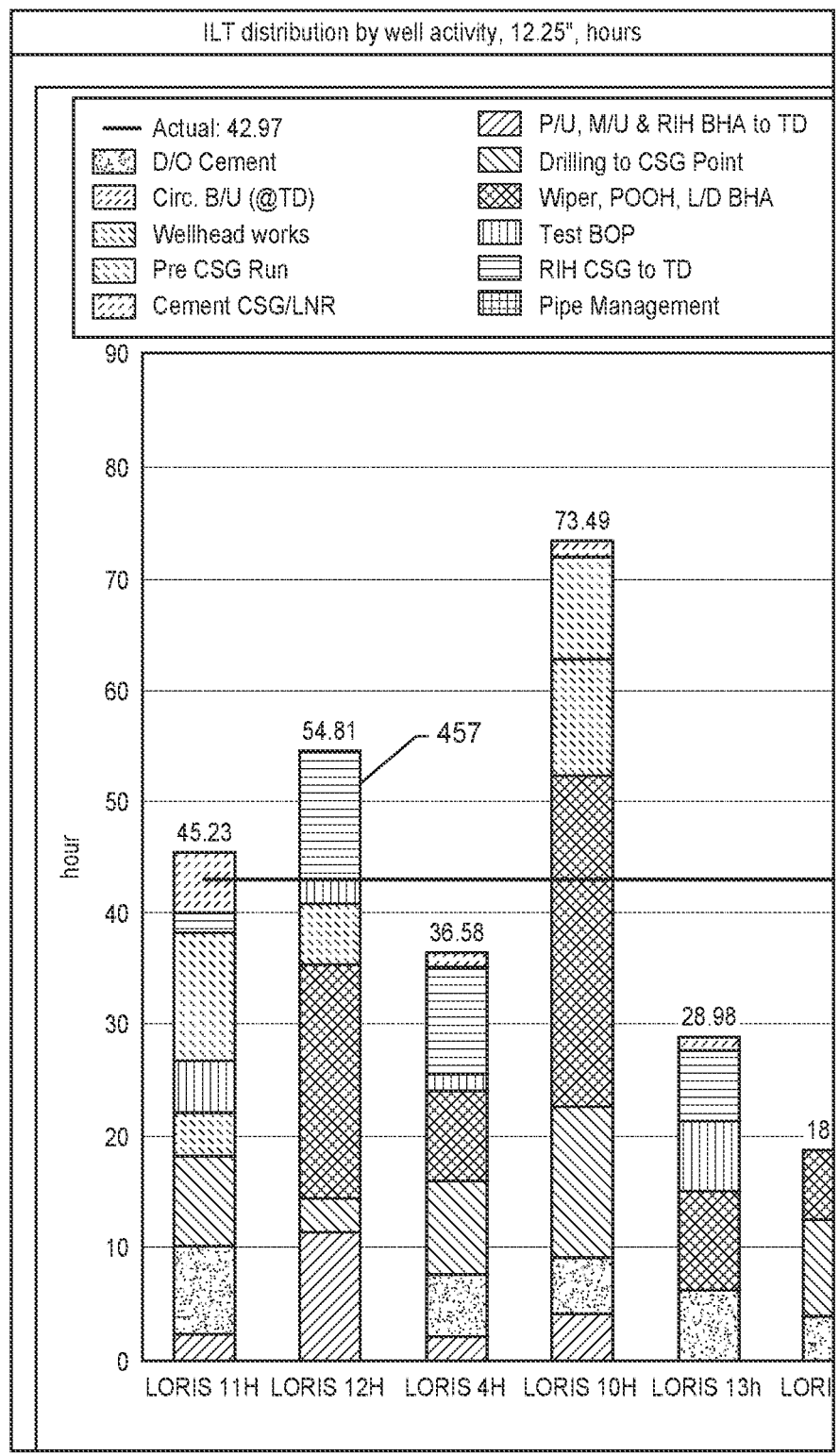
FIG. 4.4

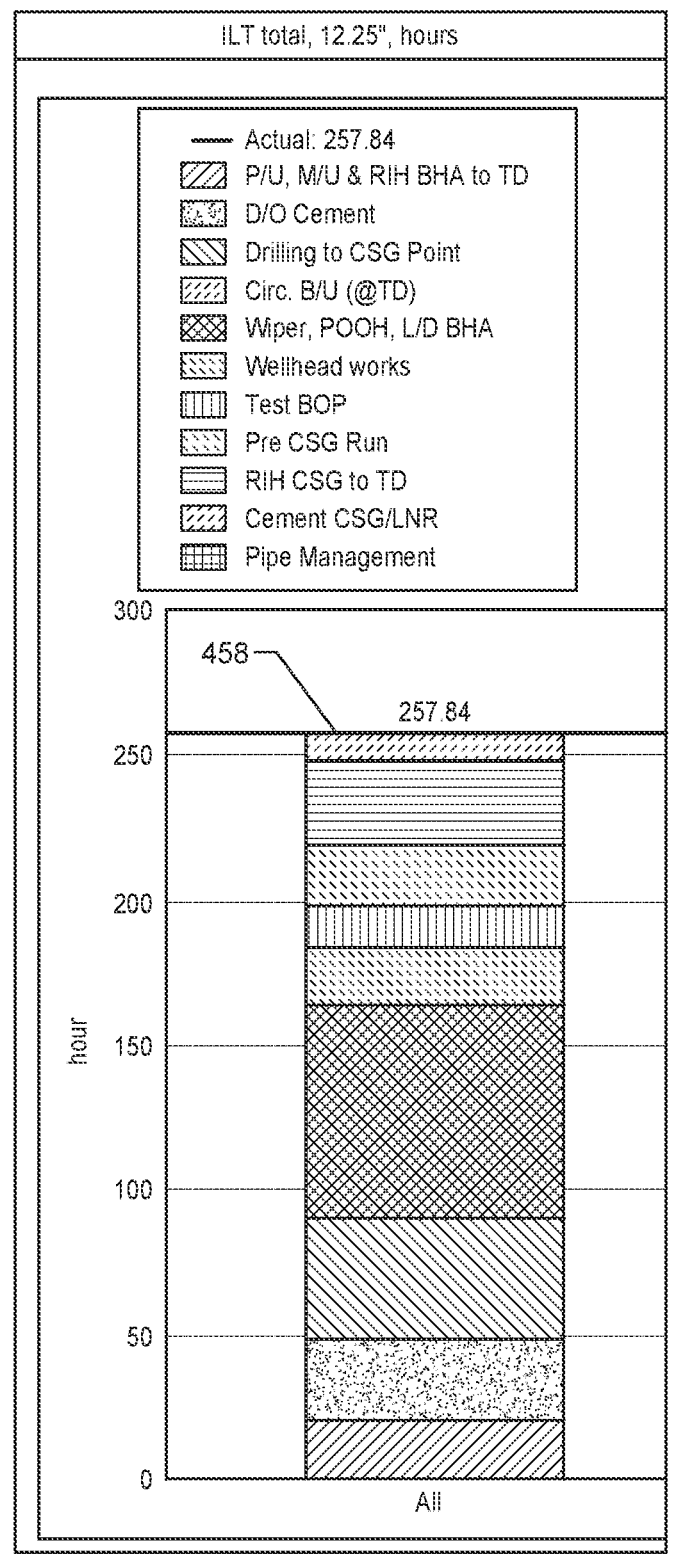
FIG. 4.5

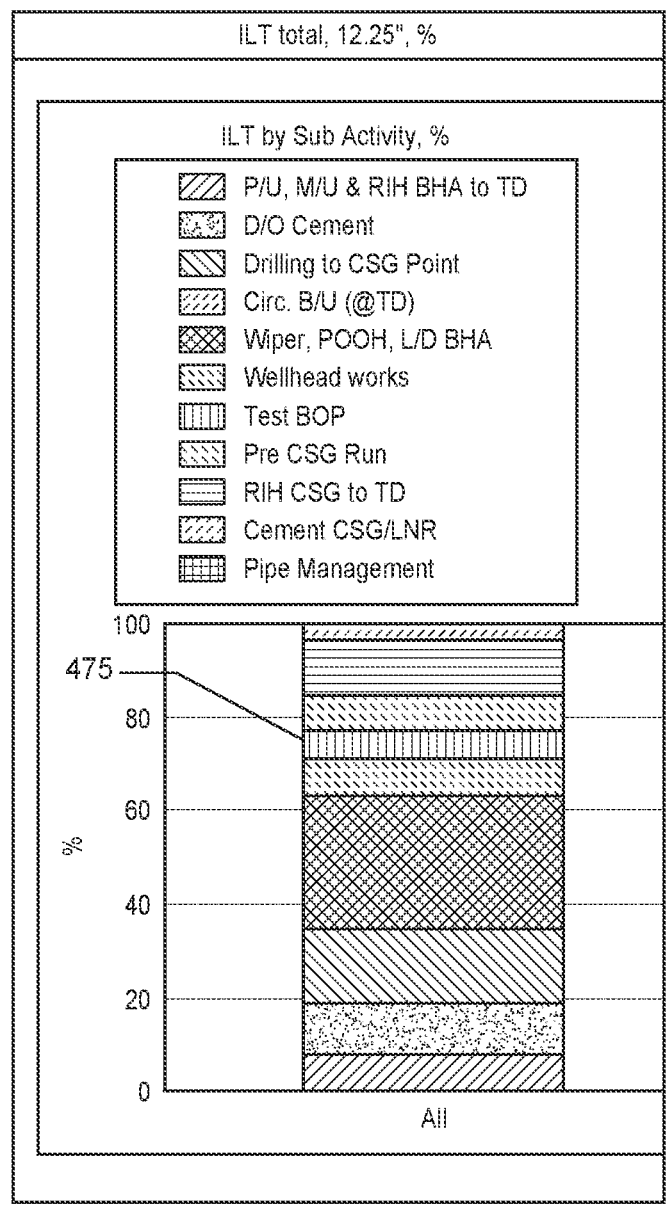
View 472
FIG. 4.6

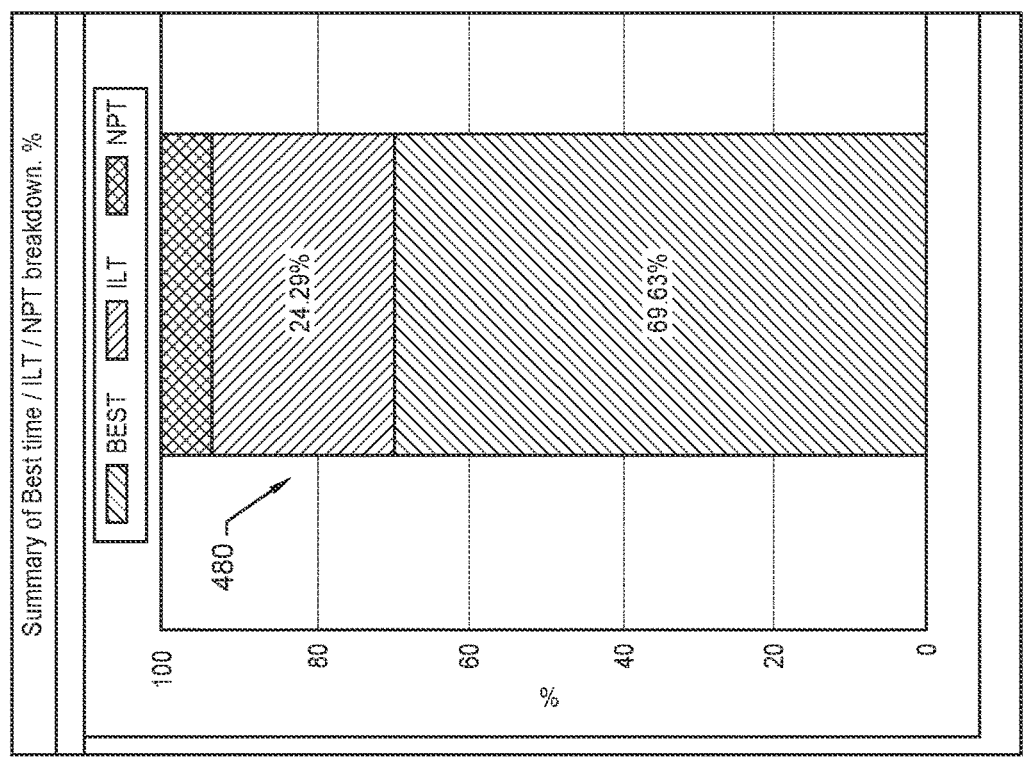
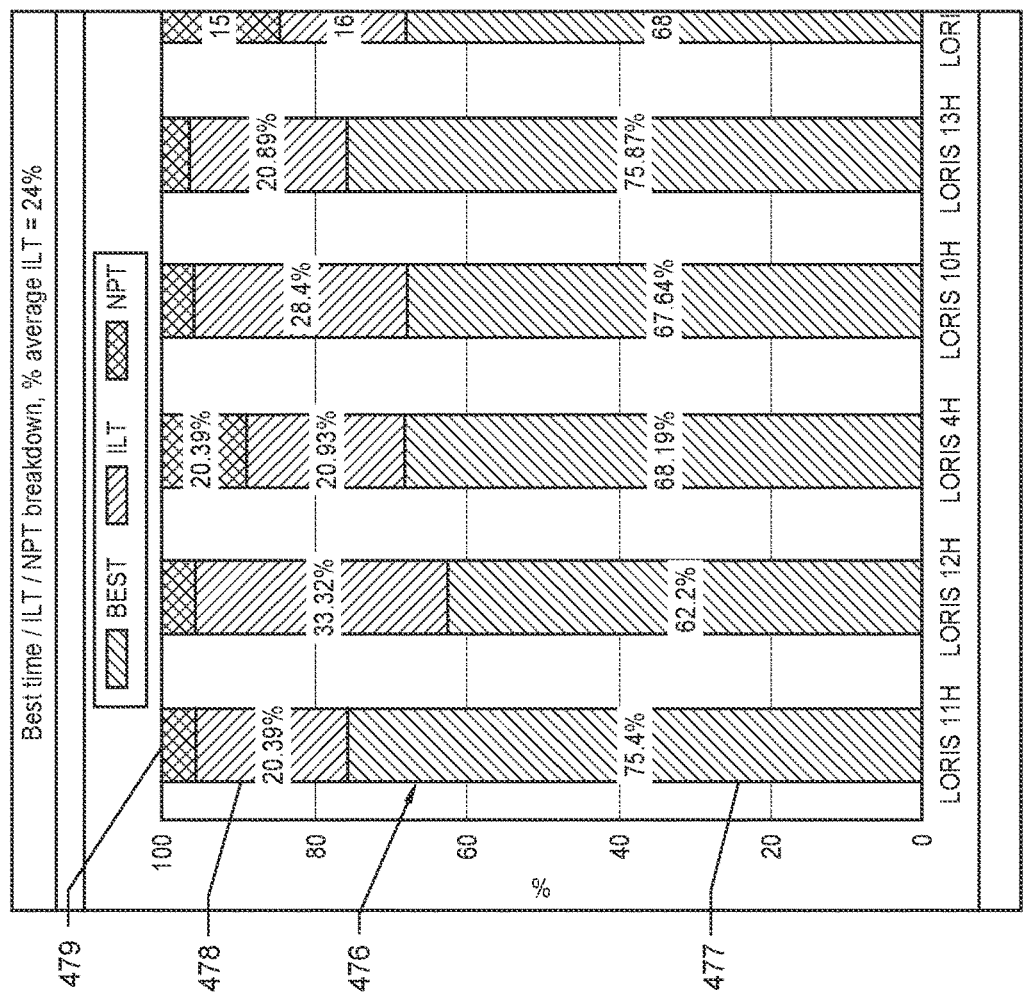
FIG. 4.7

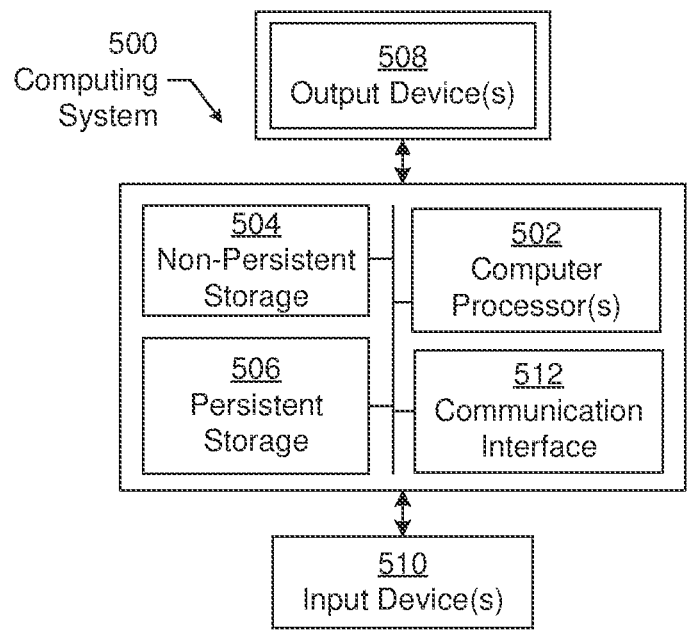
FIG. 5.1
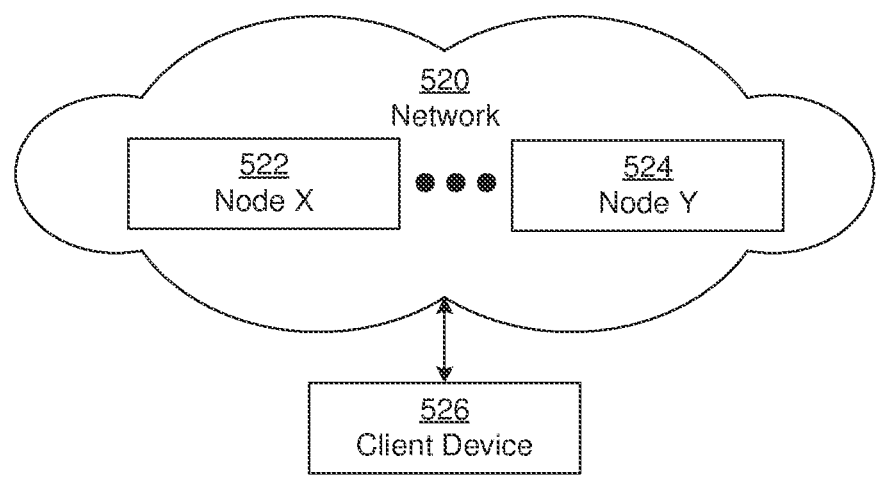
FIG. 5.2

AUTOMATIC RECOGNITION OF DRILLING ACTIVITIES BASED ON DAILY REPORTED OPERATIONAL CODES

CROSS REFERENCE TO RELATED APPLICATIONS

This application is a National Stage Entry of International Application No. PCT/US2021/017850, filed Feb. 12, 2021, which claims priority under 35 U.S.C. § 119 (e) to U.S. Provisional Patent Application No. 62/976,434 filed on Feb. 14, 2020. U.S. Provisional Patent Application No. 62/976,434 and PCT/US2021/017850 are incorporated herein in their entireties.

BACKGROUND

Drilling reports provide information about the activities and sub activities that occur at a well using multiple codes. The codes may not be consistent, may not be correctly entered, and may include unplanned operations. A challenge is for automatic computer recognition of the activities and sub activities occurring at a well based on the codes from the drilling reports.

SUMMARY

In general, in one or more aspects, the disclosure relates to a method that includes obtaining a drilling report for a well. The drilling report includes multiple codes. The method further includes obtaining a template comprising multiple rules comprising a rule. The rule maps one or more codes of the multiple codes from the drilling report to an activity label of the activity labels. The method further includes mapping the plurality of activity labels to the drilling report using the rules to identify an occurrence of an activity from the drilling report with the activity label, and presenting an activity list that includes the activity label with timing information for the activity at the well.

Other aspects of the disclosure will be apparent from the following description and the appended claims.

BRIEF DESCRIPTION OF DRAWINGS

FIG. 3.1 and FIG. 3.2 show flowcharts in accordance with disclosed embodiments.

FIG. 4.1, FIG. 4.2, FIG. 4.3, FIG. 4.4, FIG. 4.5, FIG. 4.6, and FIG. 4.7 show examples in accordance with disclosed embodiments.

FIG. 5.1 and FIG. 5.2 show computing systems in accordance with disclosed embodiments.

DETAILED DESCRIPTION

Figure 1:
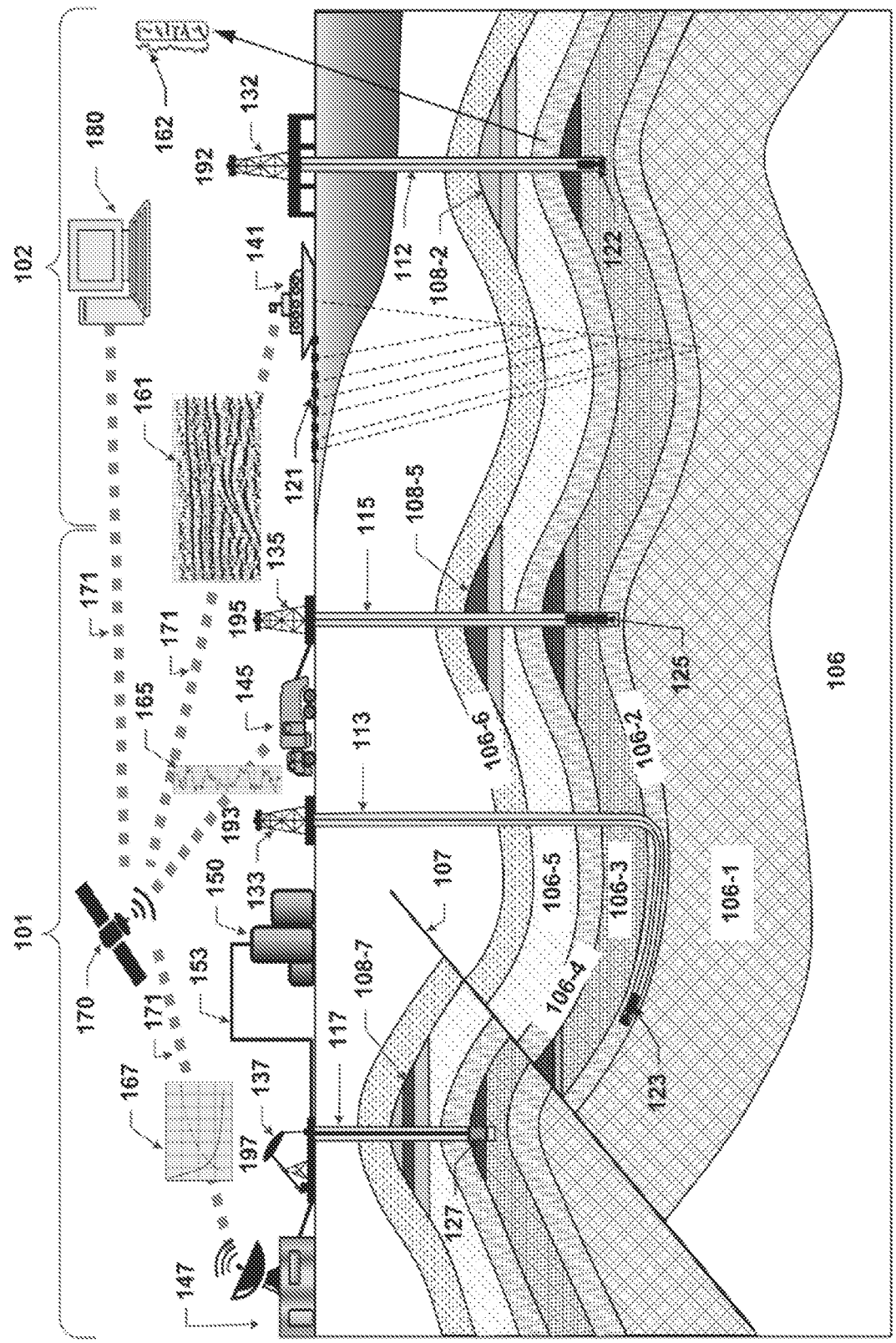
FIG. 1 shows a diagram of a system in accordance with disclosed embodiments.

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, a template is defined with rules that identify codes from drilling reports. The codes in the drilling reports identify specific activities that occur at a well during the exploration and production process. Applying the template to drilling reports automatically recognizes the activities of a well with the time taken for the activities. The time taken may be used to identify invisible lost time from the operations of the well. Further, by recognizing codes and relating codes to activities, a user interface may be generated that provides a detailed analysis of the drilling operations.

Recognition of activities of drilling rigs from drilling reports (also referred to as daily drilling reports (DDRs)) is a part of drilling performance analysis. The recognition may identify duration and speed of drilling activities and compare them across some set of wells (Field, Rig, Year, etc.). A challenge of automated recognition is the appearance of unplanned operations during drilling process (e.g. fishing, well control events, etc.). Another challenge is the quality/accuracy of DDR codes. Algorithm configuration capabilities in accordance with the disclosure may deal with these challenges and produce quality results.

The systems and methods described below may process historical records of multiple wells and estimate time and speed of drilling activities in matter of few minutes instead of the hours and days required by previous methods. The input data for automated recognition includes codes and sub codes of operations recorded in drilling reports. The input data is processed with drilling templates (also referred to as "templates").

Automated recognition is based on the drilling templates (Described below with reference to FIG. 2). Different wells may have different profiles that use different codes in a drilling report. Accordingly, multiple templates may be used to handle the differences between wells using different profiles. Once recognition is performed using the templates, the results may be presented as a list of activities with time (and speed where applicable) achieved per activity. The results of recognition may be used to identify best achieved performance and compute invisible lost time (ILT).

Once recognition is finished, unassigned time is processed and split into Gap/Unrecognized activities, which may be manually assigned to any activity per template. Modifications to the templates may trigger real time recalculations. Conflict situations (e.g., where different rules identify different activities for the same code) may be marked as unrecognized activity. When Activities are recognized they may be used for invisible lost time calculation, for filtering high frequency performance indicators, and for calculating the best of best (BoB) well times across multiple wells.

Recognition may be run for hundreds of historical wells. Activities with bad recognition may be excluded. Good wells and activities may be used to calculate targets or to display trends. Recognition quality is tracked by separate performance indicators and may be compared against a threshold. Recognition quality above a threshold is considered good and recognition quality below the threshold may be considered bad. Once activities of a well are recognized, a more detailed analysis may be made by increasing granularity on the identified activities in the graphical user interface.

Turning now to the Figures, FIG. 1 depicts a schematic view, partially in cross section, of an onshore field (101) and an offshore field (102) in which one or more embodiments may be implemented. The embodiments of FIG. 1 may include the features and embodiments described in the other figures of the application. One or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). The rock formations may include at least one seal rock, for example, the shale layer (106-6), which may act as a top seal. The rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

The surface units (141), (145), and (147) may be communicatively coupled to the E&P computer system (180) via the communication links (171). The communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 5.1 and 5.2 and described below.

Figure 2:
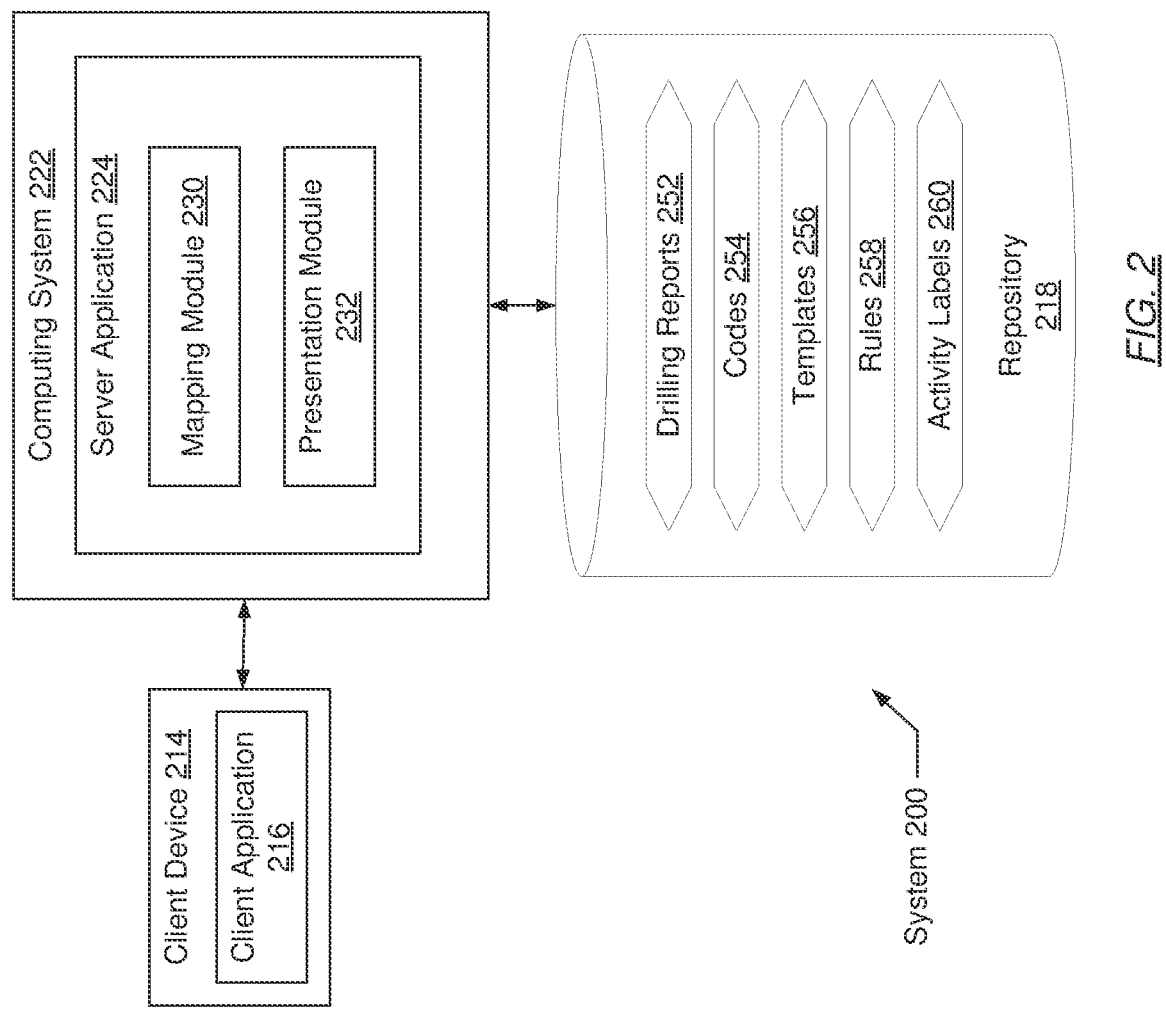
FIG. 2 shows a diagram of a system in accordance with disclosed embodiments.

FIG. 2 shows a diagram of embodiments that are in accordance with the disclosure. FIG. 2 shows the system 100, which performs automatic recognition of drilling activities based on daily reported operational codes. The embodiments of FIG. 2 may be combined and may include or be included within the features and embodiments described in the other figures of the application. The features and elements of FIG. 2 are, individually and as a combination, improvements to the technology of computing technology. The various elements, systems, and components shown in FIG. 2 may be omitted, repeated, combined, and/or altered as shown from FIG. 2. Accordingly, the scope of the present disclosure should not be considered limited to the specific arrangements shown in FIG. 2.

Turning to FIG. 2, the system (200) includes the computing system (222) that recognizes activities and sub activities occurring at a well from the codes of the drilling reports from the wells. The computing system (222) includes the server application (224).

The server application (224) is a set of programs that execute on the computing system (222). The server application (224) maps and presents information to the client device (214). The server application (224) may form a Software-as-a-Service (SaaS) platform and utilize container based deployment, event-driven protocols, non-blocking input output (I/O) models, SQL (structured query language), NoSQL (no structured query language) data modelling, representational state transfer application programming interface (RESTful API) design, etc. The programs that form the server application (224) may be deployed in local containers on the computing system (222). The server application (224) includes the mapping module (230) and the presentation module (232).

The mapping module (230) is a set of programs that execute on the computing system (222). The mapping module (230) uses the rules (258) from the templates (256) and the codes (254) from the drilling reports (252) to map the activity labels (260) to the drilling reports (252). Mapping the activity labels (260) to the drilling reports (252) identifies the activities and sub activities that occur at a well as recorded in the drilling reports (252). The mapping module (230) stores the mapping or relationships of activity labels and drilling reports in storage.

The presentation module (232) is a set of programs that execute on the computing system (222). The presentation module (232) presents information from the drilling reports (252) to the client application (216) on the client device (214). Specifically, the presentation module (232) is configured to generate a user interface.

The client device (214) is an embodiment of the computing system (500) and the nodes (522) and (524) of FIG. 5.1 and FIG. 5.2. The client device (214) includes the client application (216) for accessing the server application (224). The client application (216) may include a graphical user interface for interacting with the server application (224). A user may operate the client application (216) to generate and view drilling report information that identifies the activities and sub activities of wells from the codes (254) from the drilling reports (252).

The client application (216) may be a web browser that accesses the server application (224) using web pages hosted by the computing system (222). Additionally, the client application (216) may be a web service that communicates with the server application (224) using a representational state transfer application programming interface (RESTful API). Although a client server architecture is shown, one or more parts of the server application (224) may be a local application on the client device without departing from the claimed scope.

The repository (218) is a computing system that may include multiple computing devices in accordance with the computing system (500) and the nodes (522) and (524) described below in FIGS. 5.1 and 5.2. The repository (218) may be hosted by a cloud service provider for an E&P services provider. The cloud service provider may provide hosting, virtualization, and data storage services as well as other cloud services and the E&P services provider may operate and control the data, programs, and applications of the system (200). The data in the repository (218) may include the drilling reports (252), the codes (254), the templates (256), the rules (258), and the activity labels (260). The data in the repository (218) may be processed by programs executing on the computing system (222) as described below. The repository (218) may be hosted by the same cloud services provider as the computing system (222). The drilling reports (252), the codes (254), the templates (256), the rules (258), and the activity labels (260) may be stored in multiple computer data files by the repository (218).

The drilling reports (252) (also known as "daily drilling reports") are generated by wells that may be monitored by the system (200). A drilling report is a report of the drilling activities at the well. The drilling reports (252) include the codes (254) that encode the activities. A drilling report may be generated each day for each well and include the codes of the operations that took place during the day at the well. A drilling report may identify multiple sections of a well and the codes in the drilling report may be grouped by the sections of the well. The drilling report also provides a time interval (start/end date time) or timestamp and duration for each code.

The codes (254) include codes and sub codes. The codes and sub codes identify the operations at a well and are recorded in the drilling reports (252). Groups of wells may use the same codes and different organizations (e.g., clients of the E&P services provider) may user different codes. The codes (254) may include:

| Code | SubCode | Description |
|------|---------|-------------|
| D | DR | Drilling - Rotary Drilling |
| D | SD | Drilling - Slide Drilling |
| D | CC | Drilling - Circulation |
| D | LO | Drilling - Logging |
| C | CS | Casing - Casing running |
| C | CM | Casing - Cementing |

The templates (256) store collections of the rules (258). A drilling template (256) describes sequence of well construction activities per well section. A template may be viewed as a spreadsheet with rows and columns, an example of which is shown in FIG. 4.1. The templates (256) may include rows for each activity and sub activity with columns for the rules for the activities and sub activities Each activity contains a set of recognition rules (258). The recognition rules may include: drilling report codes from which activity may start, end and/or be comprised of; and additional properties which may improve recognition results (e.g. direction of activity (run in or out), activities priorities, dependencies, etc.). The rules (258) map certain codes (254) to certain activity labels (260). The rules (258) may include main rules, include rules, common rules, direction restriction rules, activity priorities, and restricted sequence rules. Main rules (Start/Stop) are used to trigger start/end of activity by specific set of codes. Include rules (Include, Include Start, Include End, Include Start End) are used to include specific drilling report codes when an activity has already triggered or been started. Common rules are for codes that may appear during multiple operations (e.g., codes that may appear in operations that include well control, rig service, safety meeting, etc.). Direction restriction rules (e.g., RIH/POOH) are additional direction restriction which may be applied to any rule for an activity.

Activity priorities are used to set the order of recognition, which may affect the result of the recognition, such as when several activities are based on the same codes. Restricted sequences of rules (Previous Activity/Next Activity/After Activity/Before activity) define dependencies between activities. Restricted sequences of rules are used to reduce effect of incorrect drilling report codes on the result of recognition (e.g. casing activities are after drilling activities during a section).

The activity labels (260) are labels that identify the activities at a well. An activity label uniquely identifies an activity. An activity label may be a human readable label for the activity that is internally descriptive of the activity. In other words, in contrast to a code, an activity label is descriptive of the activity. An activity label may be a text string.

FIG. 3.1 and FIG. 3.2 show flowcharts of the processes (300) and (350) in accordance with the disclosure. The process (300) recognizes activities from the codes of drilling reports. The process (350) analyzes drilling report activity. The embodiments of FIG. 3.1 and FIG. 3.2 may be combined and may include or be included within the features and embodiments described in the other figures of the application. The features of FIG. 3.1 and FIG. 3.2 are, individually and as an ordered combination, improvements to the technology of computing systems. While the various blocks in the flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven. By way of an example, determination blocks may not have a processor process an instruction unless an interrupt is received to signify that condition exists. As another example, determinations may be performed by performing a test, such as checking a data value to test whether the value is consistent with the tested condition.

Turning to FIG. 3.1, the process (300) labels activities to drilling reports from a well. In Block 302, a drilling report is obtained for a well. The drilling report may be obtained by accessing a repository that stores the drilling reports of multiple wells. The repository may receive the drilling reports from computing systems located at the wells as the drilling reports are generated, e.g., daily.

In Block 304, a template is obtained that comprises a plurality of rules that map codes from a daily drilling report to activity labels. The template may be obtained by accessing a repository that stores the templates for the wells being monitored by the system. For a particular drilling report, the well referenced in the drilling report is identified. Based on the well, the corresponding template that matches the well is identified.

In Block 306, activity labels are mapped to the drilling report using the rules to identify occurrences of activities from the drilling report with the activity labels. The mapping may be stored as an activity list that includes the activity labels and identifies the date and/or time that each activity and sub activity started and ended.

In Block 308, an activity list is presented with activity labels and timing information for the activities. The activity list may be presented by transmitting the activity list to a client device, which displays the activity list. The activity list may be displayed with information from the drilling reports used to generate the activity list.

Turning to FIG. 3.2, the process (350) analyzes and presents the information derived from the drilling reports. The information may include invisible lost time (ILT), performance indicators, and suggestions for reducing the amount of time to perform the activities of a well.

In Block 352, the activity list is presented in a log with drilling report information from the drilling report, codes, and activity labels. The log may be transmitted to and displayed on a client device, an example of which is shown in FIG. 4.2. Additionally, changes to a template that may affect the labeling of activities may be processed and shown in real time on the log.

In Block 354, invisible lost time (ILT) is calculated from timing information and activity labels mapped to the drilling report. The invisible lost time may be calculated for each well of a group of well. For each well, the time taken for each of the activities is identified. The best of best (BoB) time (i.e., the least time) for each activity is identified from the group of wells. The best of best time may be subtracted from the time taken for an activity to produce the invisible lost time.

In Block 356, performance indicators are filtered to identify the activities based on invisible lost time. Performance indicators may include the amount of time taken to perform a sub activity with an activity. The system identifies the performance indicators for each well that lead to the generation of invisible lost time. The performance indicators may be sorted for each well or activity by the amount of invisible lost time linked to a given performance indicator. Thus, performance indicators having higher invisible lost time are presented first.

In Block 358, best of best (BoB) program time is presented with and compared to an actual program time for the wells. The best of best program time may be displayed as a bar chart that includes bar components for each of the activities and sub activities of a well, examples of which are shown in FIG. 4.3. The actual time taken may be displayed in one bar and the best of best time needed may be displayed in a second bar to show the invisible lost time.

FIG. 4.1, FIG. 4.2, FIG. 4.3, FIG. 4.4, FIG. 4.5, FIG. 4.6, and FIG. 4.7 show examples of systems and interfaces in accordance with the disclosure. FIG. 4.1 shows an example of a template with rules to map codes to activities. FIG. 4.2 shows an example of a log view that displays drilling report information and activities mapped from the codes from the drilling reports. FIG. 4.3, FIG. 4.4, FIG. 4.5, FIG. 4.6, and FIG. 4.7 show examples of analyses of the drilling report information with invisible lost time. The embodiments of FIG. 4.1, FIG. 4.2, FIG. 4.3, FIG. 4.4, FIG. 4.5, FIG. 4.6, and FIG. 4.7 may be combined and may include or be included within the features and embodiments described in the other figures of the application. The features and elements of FIG. 4.1, FIG. 4.2, FIG. 4.3, FIG. 4.4, FIG. 4.5, FIG. 4.6, and FIG. 4.7 are, individually and as a combination, improvements to the technology of computing systems and machine learning systems. The various features, elements, widgets, components, and interfaces shown in FIG. 4.1, FIG. 4.2, FIG. 4.3, FIG. 4.4, FIG. 4.5, FIG. 4.6, and FIG. 4.7 may be omitted, repeated, combined, and/or altered as shown. Accordingly, the scope of the present disclosure should not be considered limited to the specific arrangements shown in FIG. 4.1, FIG. 4.2, FIG. 4.3, FIG. 4.4, FIG. 4.5, FIG. 4.6, and FIG. 4.7.

Turning to FIG. 4.1, the template (400) may be presented to and displayed on a client device. The template (400) includes the rows (401) through (406) and the columns (407) through (417).

The row (407) is a header row that identifies the meaning of the columns (401) through (406). The rows (408) through (417) list the rules that identify the activities and sub activities that occur at a well. For example, the row (408) identifies the rules for the "Preparation" activity, which are defined in the cell in the column (403).

The column (401) identifies the activities defined within the template (400). For example, the cell at the row (408) and the column (401) indicates that the row (408) provides a rule for a "Preparation" activity.

The column (402) identifies the sub activities for the activities defined the column (401). For example the rows (409) and (410) indicate that the "P/U, M/U & RIH-BHA" activities include the sub activity "P/U, M/U & RIH BHA" (in the row (409)) and the sub activity "Formation Integrity Test" (in the row (410)).

The column (403) identifies the start rules for the activities and sub activities of the columns (401) and (402). For example, the cell at the row (409) in the column (403) indicates that the codes "(AW, DRT), (D_, DRT)" in a drilling report indicate the start of the "P/U, M/U & RIH BHA" sub activity.

The column (404) identifies the include rules for the activities and sub activities of the columns (401) and (402). For example, the cell at the row (414) of the column (404) indicates that the codes "(C_, PCD), (PH, PCD), RUD), (PH, RUD), (C_, CSR)" in a drilling report indicate that the "RIH CSG to TD" has already been triggered.

The column (405) identifies the end rules for the activities and sub activities of the columns (401) and (402). If a code was included in a cell the in the column (405), then that code in a drilling report would indicate the end of an activity or sub activity.

The column (406) identifies include start rules for the activities and sub activities of the columns (401) and (402). For example, the cell at the row (415) of the column (406) indicates that the code "(C_, RUD)" in a drilling report indicates that the "Circ for Cement" sub activity and the "Cementing" activity has already been started.

Different rules may be used, which may include main rules and additional rules. Each type of rule may have a separate column.

Main rules may include a start rule and an end rule. A start rule identifies start codes that indicate the start the sub activity. Start rules may identify the end of a sub activity (i.e., identifying a start rule code may end a previous sub activity) if there are no end rules found and end rules are optional. An end rule identifies end codes that indicate end of a sub activity. End rules may identify the start of a sub activity if there are no start rules and the start rule is optional.

Additional rules include an include rule, an include_start rule, an include_end rule, an include_start_end rule, and common rules. An include rule identifies include codes that may be present within a sub activity. An include rule is added if the code appears between the result from the main rules (Start and End). Further, the set may include rules as "*" or "%" to be applied for any code. An include_start rule, IncludeStart—once a sub activity is recognized with the main rules, IncludeStart rules identify codes that are next to the start point of sub activity or between the main (start or end) codes. For example, an include_start code may occur immediately after a start code and between the start code and an end code. Once a sub activity is recognized by the main rules, include_end rules identify codes that are next to the end point of sub activity or between the main codes. Once sub activity is recognized by the main rules, include _start_end rules identify codes that are next to the end point and the start point of sub activity or between main codes. Further, common rules work similar to the include start rule but does so for the various sub activities.

Turning to FIG. 4.2, the log view (430) may be presented to and displayed on a client device. The log view (430) includes several rows and columns. In FIG. 4.2, squiggly lines are shown in place of the text that would be displayed in the actual interface.

The rows (432) present information and data of a well on a day by day basis. The column (433) identifies the days associated with the rows (432).

The columns (434) include three columns. The first (left most) column identifies the section of the well (e.g., the "12¼" section, the "8½" section, etc.) that is being worked on. The second (middle) column identifies the activity that was recognized and mapped based on a template from the codes in the columns (435). The third (right most) column identifies the sub activity that was recognized and mapped based on a template from the codes in the columns (435). The columns (435) include codes from the drilling reports.

The log view (430) may be updated in real time. For example, when the template (400) of (FIG. 4.1) is changed to have different rules, the log view (430) may be updated in response to the changes made to the rules of the template (400).

Turning to FIG. 4.3-FIG. 4.5, the view (452), the view (453), and the view (454) may be presented to and displayed on a client device. The views in FIGS. 4.3-4.5 may be in a single display adjacent to each other. The view (452), the view (453), and the view (454) show invisible lost time.

The view (452) shows the actual time taken for a 12.25" section of multiple wells in comparison with the best achieved times for similar activities. For example, for the well "LORIS 11H" the bar (455) indicates that 213.5 hours were used to perform the activities for the 12.25" section. The bar (456) indicates that 167.27 hours was the best time taken for similar activities at different wells. As shown, two bar graphs are shown side by side for each well. The bar graph on the left of the double is the actual time taken while the bar graph on the right of the double is the best achieved time for similar activities at the well. Further, each bar graph shows the number of hours of each activity stacked on each other. Thus, the bar graph shows the relative amount of time of each activity as compared to other activities.

The view (453) shows the invisible lost time for the wells. For example, the components of the bar (456) are subtracted from the components of the bar (455) to generate the components of the bar (457), which totals to 45.23 hours. The components of the bars represent the activities identified for the wells from the codes from the drilling reports of the respective wells.

The view (454) shows the total invisible lost time. The components from each of the bars in the view (453) are summed together to generate the components of the bar (458), which totals to 257.84 hours of invisible lost time for the group of wells being analyzed.

Turning to FIG. 4.6 and FIG. 4.7, the view (472), the view (473), and the view (474) may be presented to and displayed on a client device. The views in FIGS. 4.6 and 4.7 may be adjacent to each other in the interface. The view (472), the view (473), and the view (474) show invisible lost time.

The view (472) shows the invisible lost time from the view (454) (shown in FIG. 4.3) as a percentage. For example, each component is divided by the sum of the components to generate the bar (475).

The view (473) shows percentages of best time, invisible lost time, and nonproductive time (NPT) for multiple wells. For example, the bar (476) includes best component (477), the invisible lost time component (478), and the nonproductive time component (479). The best component (477) may be calculated by dividing the sum of components from the bar (456) (of FIG. 4.3) by the sum of components from the bar (455) (of FIG. 4.3), which yields a best component 75.43%. The invisible lost time component bar (476) may be calculated by dividing the sum of the components from the bar (457) of the view (453) (of FIG. 4.4) by the sum of components from the bar (455) of the view (452) (of FIG. 4.3), which yields a nonproductive time percentage of 20.39%. The nonproductive time component (479) may be the remaining percentage that is not covered by the best time component (477) or the invisible lost time component (478).

The view (474) shows a combined display of the best time, invisible lost time, and nonproductive time percentages. The bar (480) may be generated by summing the similar time components from the bars of the wells shown in the view (473) and scaling the result to 100%. For example, the total percentage of invisible lost time is shown as 24.09% for the wells being analyzed.

Embodiments disclosed herein may be implemented on a computing system. Any combination of mobile, desktop, server, router, switch, embedded device, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the technology.

The computing system or group of computing systems described in FIG. 5.1 and FIG. 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 5.1 and the nodes and/or client device in FIG. 5.2. Other functions may be performed using one or more embodiments of the technology.

While the technology has been described with respect to a limited number of embodiments, those skilled in the art, having benefit of this disclosure, will appreciate that other embodiments can be devised which do not depart from the scope as disclosed herein. Accordingly, the scope of the technology should be limited only by the attached claims.

What is claimed is:

1. A method comprising:
    performing, over a period of time, a drilling activity with drilling equipment located at a wellsite system, the drilling equipment including a drill rig at a surface location;
    collecting, using one or more data acquisition tools, drilling information about the drilling activity in a drilling report, the data acquisition tools including a seismic sensor located at a surface unit at the surface location;
    obtaining, from the surface unit located at the wellsite system, the drilling report for the wellsite system over the period of time, the drilling report comprising a plurality of codes, the plurality of codes identifying specific activities performed by drilling equipment at the wellsite system during the period of time, the drilling report generated at the period of time and including information from the one or more data acquisition tools;

obtaining, at an exploration and production computer system, a template comprising a plurality of rules including mapping relationships between the plurality of codes from the drilling report and a plurality of activity labels;

applying the template to the plurality of codes from the drilling report, wherein applying the template to the plurality of codes includes mapping an activity label of the plurality of activity labels using a rule of the plurality of rules;

identifying, based on the rule of the plurality of rules that is mapped to the activity label, an occurrence of an activity performed by the drilling equipment during the period of time;

generating, based on the occurrence of the activity, an activity list that includes the activity label with timing information for the activity at the wellsite system, the activity list including a best of best program time, the best of best program time based on a lowest time for a plurality of wells;

calculating invisible lost time (ILT) for the wellsite system from the timing information and the plurality of activity labels mapped to the drilling report, the invisible lost time based on the best of best program time and the timing information; and presenting, at a client device, the activity list and the invisible lost time.

2. The method of claim 1, wherein presenting the activity list includes presenting the activity list in a log view that includes drilling report information from the drilling report, the plurality of codes, and the activity label.

3. The method of claim 1, further comprising:
filtering performance indicators to identify the activity based on the invisible lost time; and
presenting a best of best (BoB) program time that is compared to an actual program time, wherein the actual program time includes the timing information for the activity.

4. The method of claim 1, further comprising:
mapping the activity label with the rule, wherein the rule is a main rule that identifies one of a start of an activity identified by the activity label in the drilling report and an end of the activity.

5. The method of claim 1, further comprising:
mapping the activity label with the rule, wherein the rule is an include rule that that identifies that an activity identified by the activity label in the drilling report has already been triggered based on a code from the plurality of codes that occurs during the activity.

6. The method of claim 1, further comprising:
mapping the activity label with the rule, wherein the rule is a common rule that identifies a set of codes of the plurality of codes that may occur with respect to multiple activity labels.

7. The method of claim 1, further comprising:
mapping the activity label with the rule, wherein the rule is a direction restriction rule that identifies a direction of an activity identified by the activity label.

8. The method of claim 1, further comprising:
mapping the activity label with the rule in response to the activity label having an activity priority greater than a second activity priority of a second activity label.

9. The method of claim 1, further comprising:
mapping the activity label with the rule, wherein the activity label has a sequence dependency selected from a group consisting of previous activity, next activity, after activity, and before activity.

10. The method of claim 1, further comprising:
marking a conflict with an unrecognized activity label, wherein the conflict occurs when at least two activity labels are identified by at least two rules of the plurality of rules to correspond to a single portion of the drilling report.

11. A system comprising:
drilling equipment including a drill rig at a surface location;
a surface unit configured to, over a period of time, perform a drilling activity at a wellsite system;
one or more data acquisition tools configured to collect drilling information about the drilling activity, the one or more data acquisition tools including a seismic sensor located at a surface unit at the surface location;
a memory coupled to a processor; and
an application that executes on the processor, uses the memory, and is configured for:
generate a drilling report using the drilling information;
obtaining, from the surface unit located at the wellsite system, the drilling report for the wellsite system over the period of time, the drilling report comprising a plurality of codes, the plurality of codes identifying specific activities performed by drilling equipment at the wellsite system during the period of time, the drilling report generated at the period of time and including information from the one or more data acquisition tools;
obtaining, at an exploration and production computer system, a template comprising a plurality of rules including mapping relationships between the plurality of codes from the drilling report and a plurality of activity labels;
applying the template to the plurality of codes from the drilling report, wherein applying the template to the plurality of codes includes mapping an activity label of the plurality of activity labels using a rule of the plurality of rules;
identifying, based on the rule of the plurality of rules that is mapped to the activity label, an occurrence of an activity performed by the drilling equipment during the period of time;
generating, based on the occurrence of the activity, an activity list that includes the activity label with timing information for the activity at the wellsite system, the activity list including a best of best program time, the best of best program time based on a lowest time for a plurality of wells;
calculating invisible lost time (ILT) for the wellsite system from the timing information and the plurality of activity labels mapped to the drilling report, the invisible lost time based on the best of best program time and the timing information; and
presenting, at a client device, the activity list and the invisible lost time.

12. The system of claim 11, wherein
presenting the activity list includes presenting the activity list in a log view that includes drilling report information from the drilling report, the plurality of codes, and the activity label.

13. The system of claim 11, wherein the application is further configured for:
   filtering performance indicators to identify the activity based on the invisible lost time; and
   presenting a best of best (BoB) program time that is compared to an actual program time, wherein the actual program time includes the timing information for the activity.

14. The system of claim 11, wherein the application is further configured for:
   mapping the activity label with the rule, wherein the rule is a main rule that identifies one of a start of an activity identified by the activity label in the drilling report and an end of the activity.

15. The system of claim 11, wherein the application is further configured for:
   mapping the activity label with the rule, wherein the rule is an include rule that that identifies that an activity identified by the activity label in the drilling report has already been triggered based on a code from the plurality of codes that occurs during the activity.

16. The system of claim 11, wherein the application is further configured for:
   mapping the activity label with the rule, wherein the rule is a common rule that identifies a set of codes of the plurality of codes that may occur with respect to multiple activity labels.

17. The system of claim 11, wherein the application is further configured for:
   mapping the activity label with the rule, wherein the rule is a direction restriction rule that identifies a direction of an activity identified by the activity label.

18. The system of claim 11, wherein the application is further configured for:
   mapping the activity label with the rule in response to the activity label having an activity priority greater than a second activity priority of a second activity label.

19. The system of claim 11, wherein the application is further configured for:
   mapping the activity label with the rule, wherein the activity label has a sequence dependency selected from a group consisting of previous activity, next activity, after activity, and before activity.

20. A non-transitory computer readable medium comprising computer readable program code for:
   performing, over a period of time, a drilling activity with drilling equipment located at a wellsite system, the drilling equipment including a drill rig at a surface location;
   collecting, using one or more data acquisition tools, drilling information about the drilling activity in a drilling report, the data acquisition tools including a seismic sensor located at a surface unit at the surface location;
   obtaining, from the surface unit located at the wellsite system, the drilling report for the wellsite system over the period of time, the drilling report comprising a plurality of codes, the plurality of codes identifying specific activities performed by drilling equipment at the wellsite system during the period of time, the drilling report generated at the period of time and including information from the one or more data acquisition tools;
   obtaining, at an exploration and production computer system, a template comprising a plurality of rules including mapping relationships between the plurality of codes from the drilling report and a plurality of activity labels;
   applying the template to the plurality of codes from the drilling report, wherein applying the template to the plurality of codes includes mapping an activity label of the plurality of activity labels using a rule of the plurality of rules;
   identifying, based on the rule of the plurality of rules that is mapped to the activity label, an occurrence of an activity performed by the drilling equipment during the period of time;
   generating, based on the occurrence of the activity, an activity list that includes the activity label with timing information for the activity at the wellsite system, the activity list including a best of best program time, the best of best program time based on a lowest time for a plurality of wells;
   calculating invisible lost time (ILT) for the wellsite system from the timing information and the plurality of activity labels mapped to the drilling report, the invisible lost time based on the best of best program time and the timing information; and
   presenting, at a client device, the activity list and the invisible lost time.

* * * * *